March 14, 1961   G. S. ALLIN, SR., ET AL   2,974,753
BRAKE AND ACTUATING MEANS FOR TRACTOR WINCH
Filed Jan. 30, 1956   5 Sheets-Sheet 3
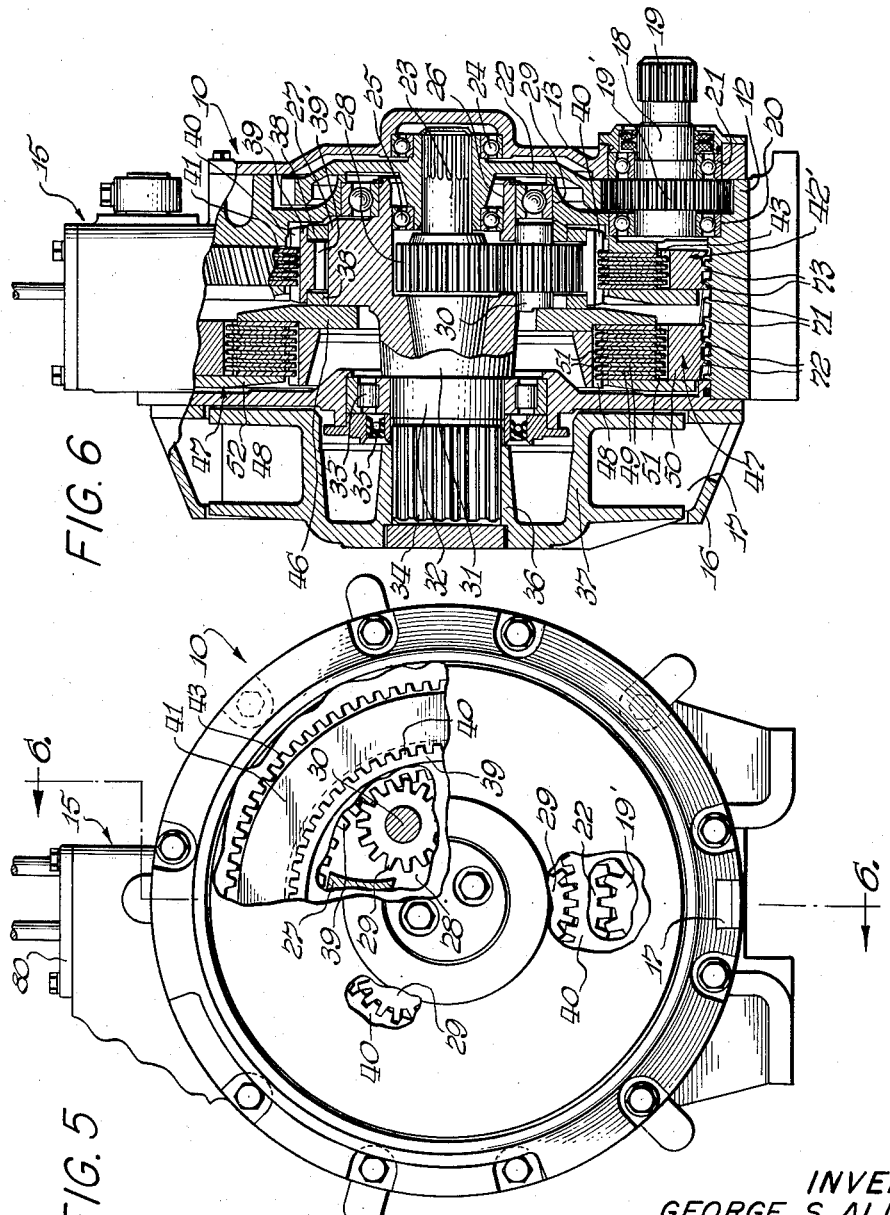
INVENTORS
GEORGE S. ALLIN, SR.
JOHN K. LIU
VERNON E. REZABEK
ATTORNEY

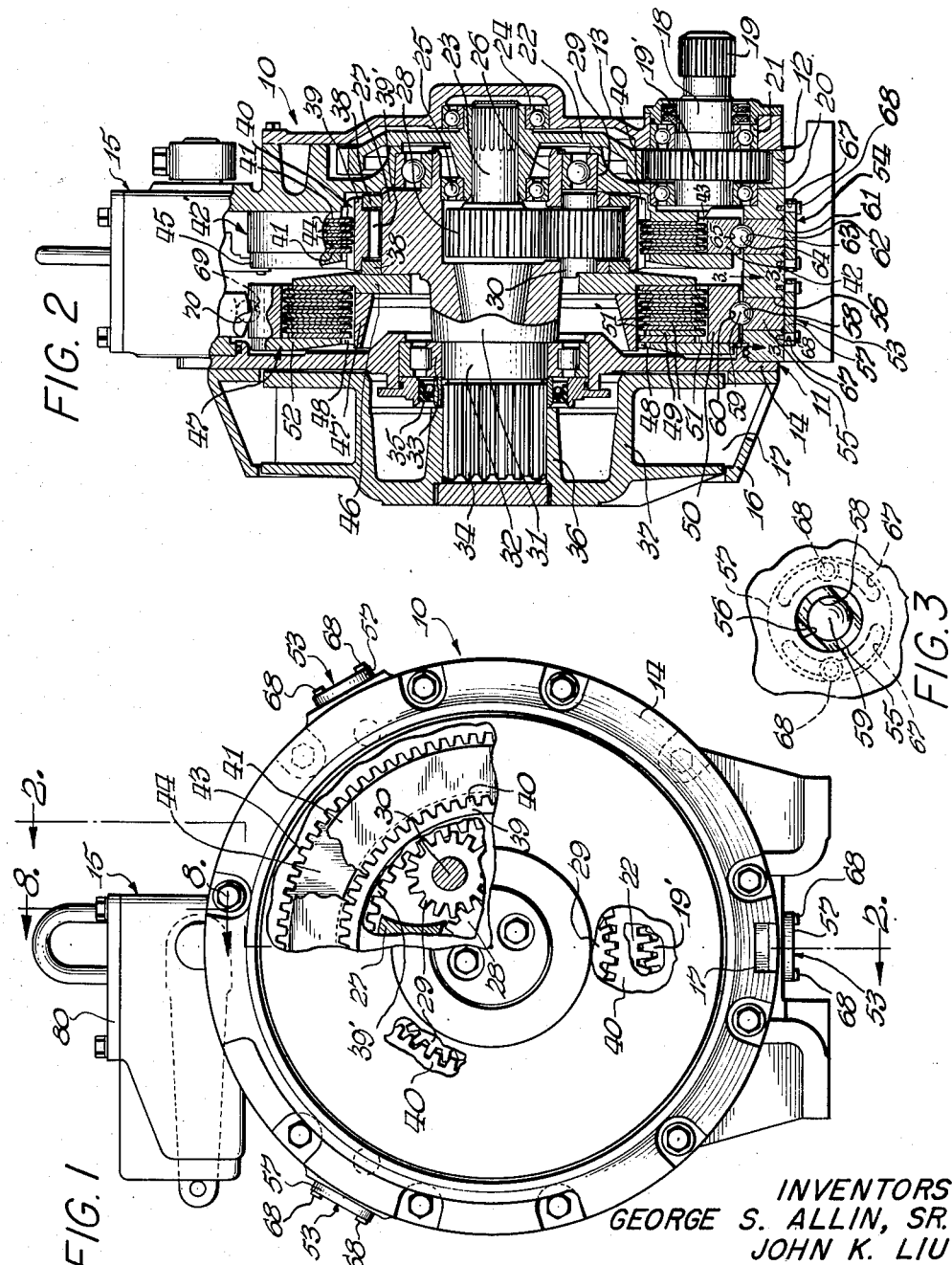
March 14, 1961 G. S. ALLIN, SR., ET AL 2,974,753
BRAKE AND ACTUATING MEANS FOR TRACTOR WINCH
Filed Jan. 30, 1956 5 Sheets-Sheet 1
INVENTORS
GEORGE S. ALLIN, SR.
JOHN K. LIU
VERNON E. REZABEK
ATTORNEY

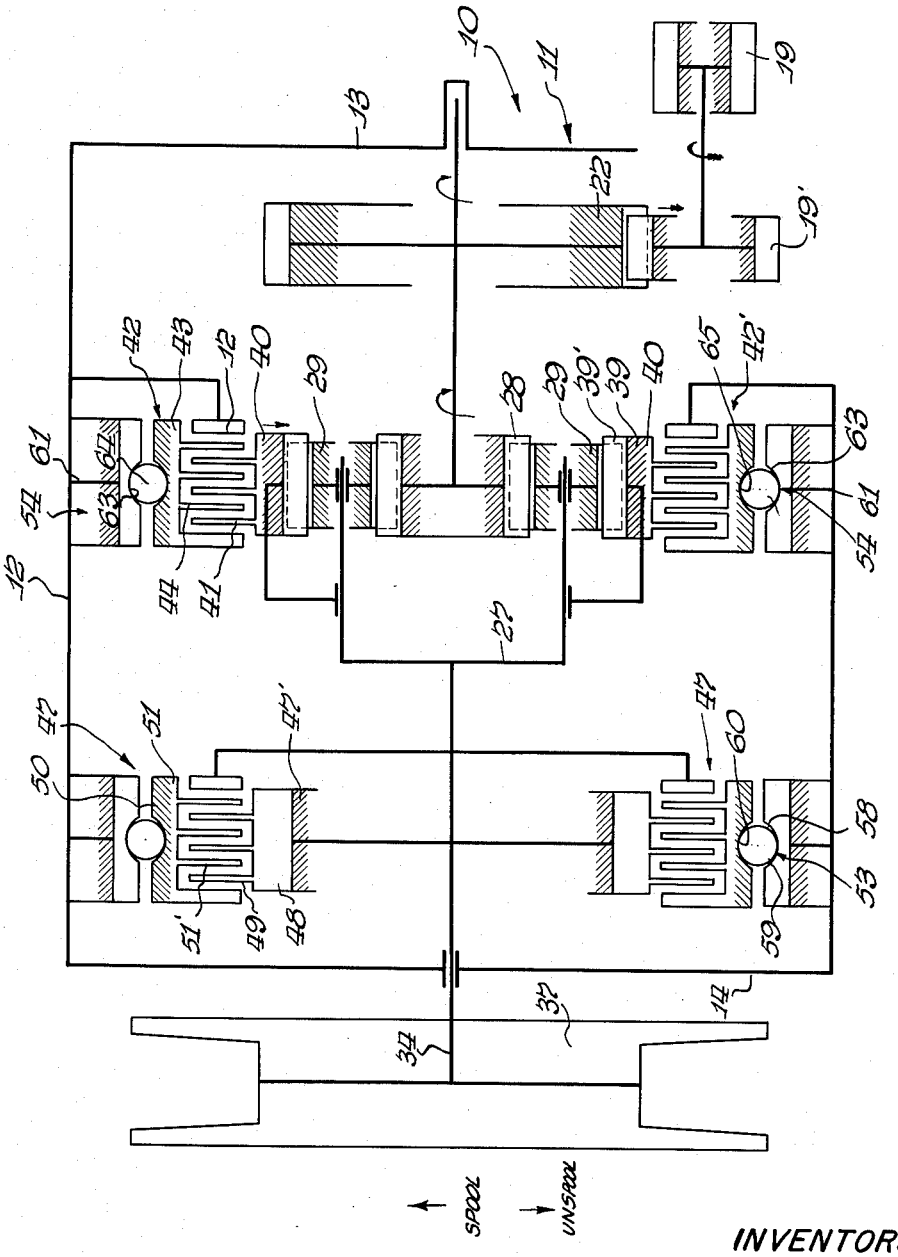

INVENTORS
GORGE S. ALLIN, SR.
JOHN K. LIU
VERNON E. REZABEK
ATTORNEY

March 14, 1961 G. S. ALLIN, SR., ET AL 2,974,753
BRAKE AND ACTUATING MEANS FOR TRACTOR WINCH
Filed Jan. 30, 1956 5 Sheets-Sheet 5
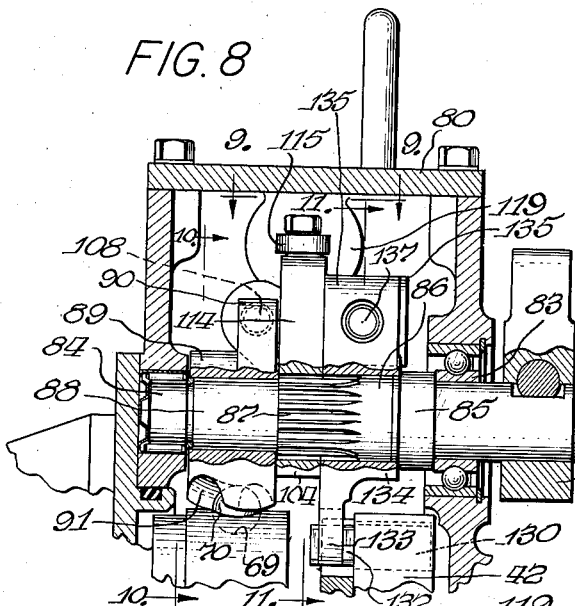
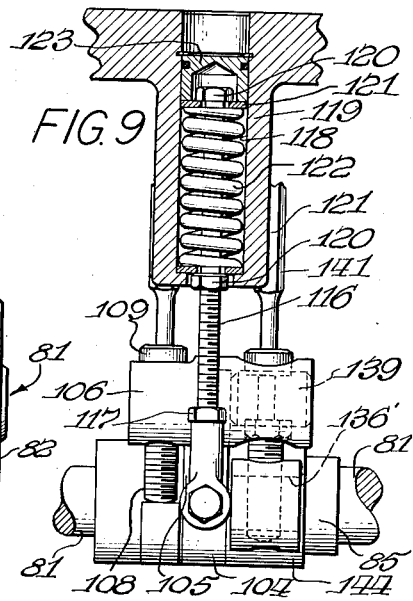
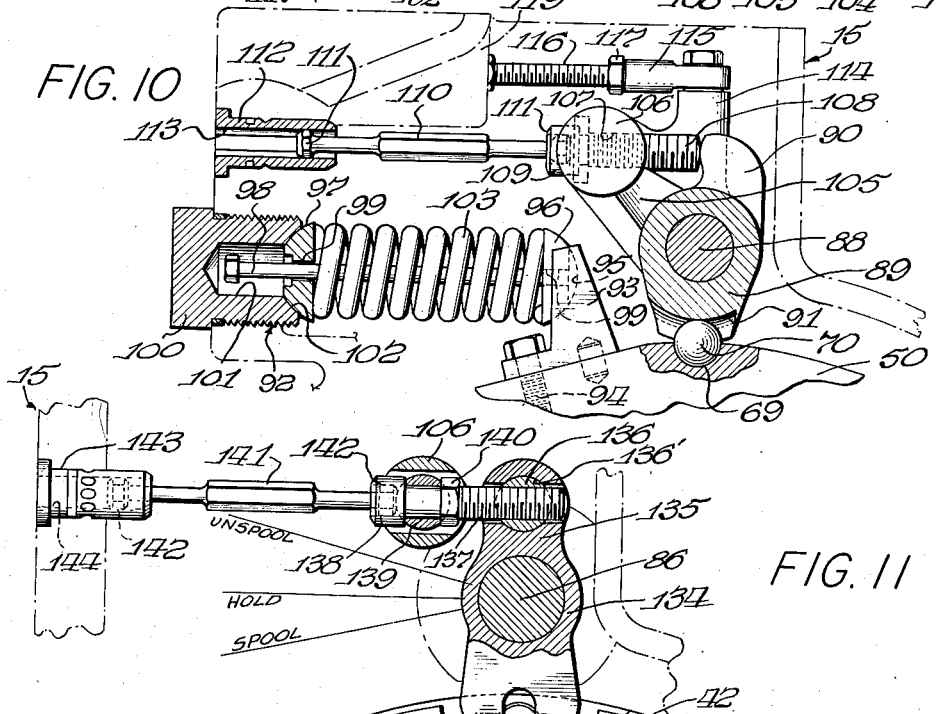
INVENTORS
GEORGE S. ALLIN, SR.
JOHN K. LIU
VERNON E. REZABEK
ATTORNEY

United States Patent Office

2,974,753
Patented Mar. 14, 1961

2,974,753

BRAKE AND ACTUATING MEANS FOR TRACTOR WINCH

George S. Allin, Sr., Flossmoor, John K. Liu, Chicago, and Vernon E. Rezabek, Berwyn, Ill., assignors to International Harvester Company, a corporation of New Jersey Filed Jan. 30, 1956, Ser. No. 562,201

4 Claims. (Cl. 188—72)

This invention relates to a winch and more particularly to an actuating and braking device for winches.

Generally this invention relates to an improved brake and actuating device for a tractor winch of a type particularly adapted for controlling earth moving equipment such as scrapers, bulldozers, and similar equipment associated with a crawler tractor.

Thus, it is a prime object of this invention to provide an improved brake and actuating means for a winch.

A still further object is to provide an improved winch and cable control means comprising a sealed housing eliminating the entrance of dirt and other foreign matter from the brake of the cable control means.

A further object is to provide winch and cable control means having brake means operating in a sealed oil bath, thus having improved operating characteristics and requiring less maintenance due to increased cooling action of the oil.

Still another object is to provide an improved type of cable control means for a winch, the said means including an improved brake mechanism utilizing disks and having more efficient brake characteristics.

Another object is to provide a cable control means having a self-energized braking mechanism where in a neutral position the drum of the winch is held in a hold or locked position.

Another important object is to provide an improved cable control mechanism having disk type brake units operable to be self-energized and having adjustable means disposed to provide an axial thrust between brake disks during certain stages of operation.

A still further object is to provide an improved disk type clutch for a cable control means, the said brake having improved means for imparting an axial thrust against the disks to provide positive braking action.

These and other object will become more readily apparent from a reading of the description when examined in connection with the accompanying sheets of drawings.

In the drawings:

Figure 1 is an elevational view, partially in section, looking at the rear of a winch and cable control unit;

Figure 2 is a cross sectional view taken substantially along the line 2—2 of Figure 1;

Figure 3 is an enlarged detail view of an adjustment taken substantially along the line 3—3 of Figure 2;

Figure 4 is a diagrammatic or schematic view showing the power flow and operating characteristics of the cable control unit disclosed in Figures 1, 2 and 3;

Figure 5 is an elevational view, partially in section, looking at the rear of a modified embodiment of a winch and cable control unit;

Figure 6 is a cross sectional view taken substantially along the line 6—6 of Figure 5;

Figure 8 is an enlarged cross sectional view of an operating mechanism for controlling a cable control unit, the said view being taken substantially along the line 8—8 of Figure 1;

Figure 9 is an enlarged detail view taken substantially along the line 9—9 of Figure 8;

Figure 10 is a cross sectional view taken substantially along the line 10—10 of Figure 8; and Figure 11 is a cross sectional view taken substantially along the line 11—11 of Figure 8.

Figure 7:
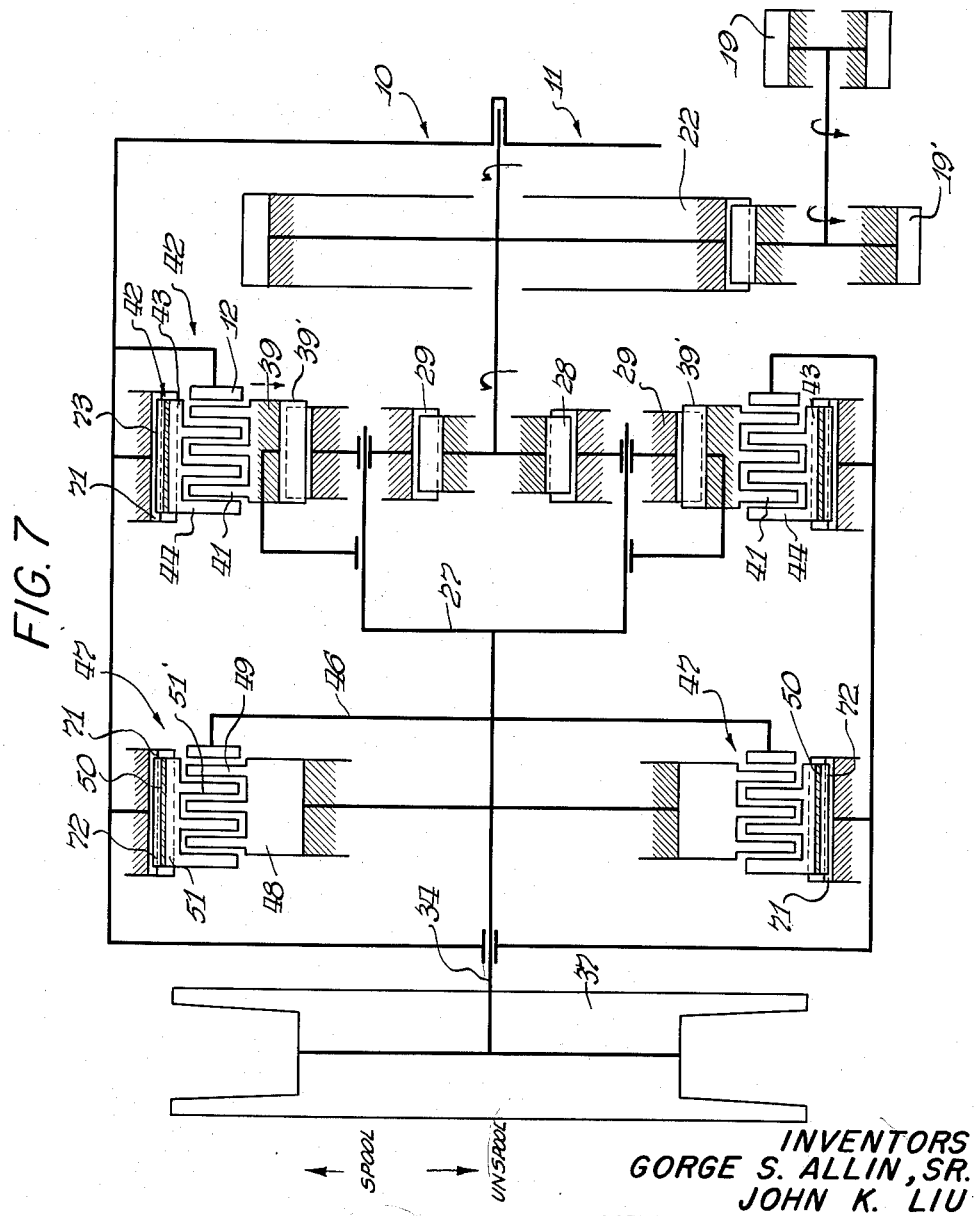
Figure 7 is a diagrammatic or schematic view showing the power flow and operating elements of the modified embodiment of the invention disclosed in Figures 5 and 6.

Referring now particularly to Figures 1 through 4, a winch and cable control unit is generally designated by the reference character 10. The unit 10 comprises a housing or casing 11 having a generally annular casing portion 12'. A front cover 13 and a rear cover 14 are securely connected to the annular casing portion 12 to substantially enclose and seal the casing 11. The terms "front" and "rear" are relative and are used in the sense that the present unit may be mounted on the rear of a crawler tractor wherein the power take-off shaft of the tractor extends rearwardly for proper connection to the control unit. It is, of course, obvious that the unit may be mounted in various positions on the tractor for proper association with a power take-off means. A control lever housing 15 is suitably connected to the top of the casing 11. A cable drum housing 16 is also suitably connected to the rear of the casing 11. The cable drum housing 16 comprises a chamber 17 for a cable to be operated by the cable control unit.

An input shaft 18, having a connector pinion or spline 19 is journaled on bearings 20 and 21 suitably supported on the casing 12. A pinion 19' is connected for rotation with the shaft 18, the said pinion 19' being in mesh with a gear 22. The gear 22 is in turn in driving connection with a stub shaft 23. The gear 22 is suitably supported by means of a bearing 24, supported on the cover member 13. The gear 22 is also supported by a bearing 25, in turn supported in a bore 26 of a planet carrier 27. A sun gear 28 is connected for rotation to and with the shaft 23. Three planetary gears 29 are journaled on shafts 30 suitably connected to the planet carrier 27. An extension 31 of the planet carrier 27 includes a bearing portion 32 which is suitably journaled in a bearing 33 mounted on the rear cover 14. A spline shaft 34 is connected to the bearing portion 32 and an oil seal 35 is suitably connected to the rear cover 14 for sealing the same. A hub 36 is splined to the spline shaft 34, the said hub forming an integral part of a cable drum 37.

Laterally spaced rings 38 encircle the planet carrier 27, the said rings 38 having positioned thereon a ring gear 39 having internal teeth 39' in mesh with the planet gears 29. The ring gear 39 includes exterior teeth 40 which suitably support a plurality of disks 41 in driving relation. An annular brake carrier 42, forming part of a brake 42', encircles the ring gear 39, the said brake carrier 42 having internal teeth 43 to which are splined a plurality of disks 44 positioned between the disks 41. A ring or pressure plate 45 is suitably connected for rotation with the carrier 42.

A thrust or pressure reaction plate 46 encircles the extension 31, the same thrust plate 46 being positioned against the planet carrier 27. The thrust plate 46 is positioned adjacent a second brake generally designated at 47. The second brake 47 includes an annular brake disk holder 47' having a plurality of external teeth 48. The teeth 48 are suitably splined to a plurality of disks 49. A brake disk carrier 50 is provided with internal teeth 51 to which a plurality of disks 51' are suitably splined. The disks 51' are disposed between disks 49. An annular end or pressure plate 52 is positioned adjacent the holder 47' and the disk carrier 50.

The modified embodiment shown in Figures 5, 6 and 7 includes the elements above described and in this respect the said modified embodiment is identical to the structure shown in Figures 1 through 4. Thus the same reference characters used in the construction shown in Figures 1 through 4 are applied to the construction shown in Figures 5, 6 and 7.

Referring now to Figures 1 through 4, inclusive, a brake adjustment for the brake 47 is generally referred to by the reference character 53. The brake carrier 42 above described includes a brake adjustment which is generally referred to by the reference character 54. The brake adjustment 53 comprises a cylindrical member 55, particularly well shown in Figure 3. The member 55 is rotatably positioned within a bore 56 within the annular casing portion 12. As best shown in Figure 2, three of the adjustments 53 are disposed on and about the casing 11. Each cylindrical member 55 includes a shoulder 57 at one end, each said member 55 being provided at its opposite end with a groove 58. The groove 58 is adapted to contain a ball 59 rotatably disposed in a socket 60 provided in the outer peripheral surface of the brake disk carrier 50. In other words, since three of the brake adjustments 53 are provided, three of these balls 59 are positioned in circumferentially spaced relation on the carrier 50 as indicated.

Each brake adjustment 54 (of which there are also three provided) is provided with a cylindrical member 61 having a shoulder 62 at one end and being provided with a groove 63 at its other end. The groove 63 is adapted to be engaged by a ball 64 provided in a socket 65 on the brake carrier 42. Thus three of the balls 64 are positioned above the outer periphery of the carrier 42.

As best shown in Figure 3, the shoulders 57 of the cylindrical members 55 are provided with arcuate slots 67. Setscrews 68 are provided in the slots 67 and extend into the casing portion 12. As indicated in Figure 2, the cylindrical member 61 is constructed in the same manner. Thus it is apparent that the cylindrical members 55 and 61 may be rotated to a number of positions by merely loosening up the setscrews 68 and the same may be maintained in an adjusted position by merely tightening the setscrews 68. One of the angled positions of one of the members 55 is shown in Figure 3. Of course various other means may be employed to keep the members 55 and 61 in adjusted positions.

The carrier 50, as best indicated in Figures 2 and 10, likewise is provided at its upper end with a socket 69 in which a ball 70 is positioned.

Referring now to the modification shown in Figures 5, 6 and 7, adjustment of the brake 47 and the brake 42' is accomplished by means of internal helical splines or teeth 71 formed on the interior peripheral surface of the casing portion 12. The splines 71 extend in annular or generally helicoid relation and the carrier 50 is provided with similar splines or teeth 72 on its external periphery, the said splines or teeth 72 being suitably threaded relative to the splines or teeth 71. Likewise in the embodiment of Figures 5, 6 and 7 the brake carrier 42 is provided with external teeth or splines 73 suitably engaging or being threaded relative to the splines 71. Thus in both the first embodiment and in the modification, relative rotation of the carriers 50 and 42 relative to the casing portion 12 provides for movement of the said carriers in an axial direction toward the front cover 13. Thus rotation in one direction of the carrier 50 relative to the casing portion 12 provides for movement of the carrier 50 and the disks 51', which are splined to it, toward the fixed pressure plate 46. Of course, movement in an opposite direction of the carrier 50 provides for axial movement of the carrier 50 in a direction axially away from the pressure plate 46. Likewise the brake mechanism 42', with the carrier 42 being rotated in a first direction, will cause the carrier 42 to be moved axially toward the right as shown in Figures 2 and 4 and in the modified form shown in Figures 6 and 7. The operation of the brake adjustments will be further described in the operation.

The control lever housing 15 and the parts contained therein may be identical for both constructions respectively shown in Figures 1 through 4 and 5 through 7. Referring now particularly to Figures 8 through 11, the housing 15 is suitably sealed by means of a cover 80. A shaft 81 is journaled on the housing 15 and a lever arm 82 is suitably keyed to the shaft 81. The lever arm 82 may be suitably controlled by means of various movable arms (not shown) actuated by an operator on the tractor seat. Bearings 83 and 84 suitably journal the shaft 81 on the said housing 15. The shaft 81 comprises an annular shoulder portion 85, and adjacent to the same, a journal portion 86 is provided. A spline 87 is positioned adjacent the shoulder portion 86 and a journal portion 88 is provided on the shaft 81 adjacent the spline 87. As best shown in Figure 10, a rocker arm 89 is suitably journaled on the journal portion 88, the said rocker arm 89 including an upwardly extending projection 90. The lower end of the rocker arm 89 is provided with an angled groove 91 which is adapted to engage the ball 70 disposed in the socket 69 of the carrier 50.

An energizing member, for self-energizing each carrier 50, is generally designated by the reference character 92. The mechanism 92 comprises a bracket 93 suitably supported on the carrier 50 by means of a bolt 94. A socket 95 is provided on the bracket 93 and a semi-spherical washer 96 is disposed within the said socket 95. A semi-spherical washer 97 is also suitably supported in spaced relation relative to the washer 96. A rod 98 extends through bores 99 in the washers 96 and 97, one end of the rod 98 extending into an adjustable member 100. The adjustable member 100 comprises a bore 101 having at one end a socket 102 which suitably supports the washer 97. The spring 103 is held captive between the washers 96 and 97, the said spring exerting a pressure constantly tending to move the carrier 50 in a clockwise position as indicated in Figure 10.

As best shown in Figures 8, 9 and 10, a collar 104 is splined to the spline 87. The collar 104 has connected thereto an arm 105 suitably supporting an integral boss 106. The boss 106 is provided with a threaded bore 107 in which a setscrew 108 is adjustably positioned. The setscrew 108 includes a socket head 109 to which an extension 110 is connected. The extension 110 comprises hexagonal heads 111 disposed at opposite ends. One of said heads 111 extends into a sleeve 112 rotatably positioned in the housing 15. The sleeve 112 includes a hexagonal bore 113 adapted to receive a suitable hexagonal key (not shown) for adjusting or turning the said sleeve 112.

An upwardly extending boss 114 is provided on the collar 104. A sleeve 115 is suitably connected to the boss 114, the said sleeve 115 having a threaded rod 116 adjustably connected thereto. A jam nut 117 is provided for locking the said rod 116 to the sleeve 115. As best shown in Figure 9, the rod 116 extends into a recess 118 provided within a boss 119 integrally formed with the casing 15. Nuts 120 suitably space washers 121 in longitudinally spaced relation on the rod 116. A spring 122 is held captive between the washers 121. A cup-shaped member 123 is suitably secured at one end of the recess 118 for containing the spring 102 captive within the recess 118. The spring 122 maintains the shaft 81 and the collar 104 in the neutral position indicated, and movement of the lever 82 in up or down direction is against the action or force of the said spring 122.

Referring now to Figures 8 and 11, a stud 130 is threaded into the side of the carrier 42. The stud 130 is adapted to be disposed within an arcuate cutout portion 131 in the ring plate 45. The stud 130 thus is loosely threaded into the carrier 42 and the said stud is provided with oppositely disposed flats 132. A fork 133 is integrally formed with an arm 134 journaled on the journal portion 86. An end portion 135 of the arm 134 is provided with a pin 136 that is journaled within a bore 136' in the said end portion 135. A setscrew 137 is threaded through the pin 136, the said setscrew 137 having a socket head 138. A rotatable member or pin 139, as best shown in Figures 9 and 11, is disposed within the boss 106. The screw 137 extends through the pin 139 and a jam nut 140 suitably locks the setscrew 137 against axial movement.

The setscrew 137 may be suitably adjusted by means of an extension 141 having oppositely disposed hexagonal heads 142. One of the said heads 142 fits into the socket head 138 and the other hexagonal head 142 extends into a sleeve 143 rotatably positioned in the housing 15. The sleeve 143 includes a hexagonal bore 144 which may be engaged by a suitable wrench for rotating the extension 141 and the setscrew 137.

The operation

Referring now particularly to Figures 1 through 4 and 8 through 11 in the "hold" or neutral position the lever arm 82 is positioned as shown in Figures 8 and 11. By the "hold" position, it is meant that the drum 37 is prevented from unspooling or against clockwise rotating movement (Fig. 1). The unit 10 has been attached to the front or rear power take-off of a tractor and may be utilized by means of cables for controlling the components of various earth moving implements. The power take-off of a tractor is suitably connected to the pinion 19 for rotating the same in the direction shown in Fig. 4. The pinion 19 is constantly rotating during the operation of the unit. In the "hold" position the energizing mechanism shown in Figure 10, by virtue of the action of the spring 103, causes the carrier 50 to be rotated in a clockwise direction. As the carrier 50 is rotated in this direction, the same moves in an axial direction toward the fixed pressure plate 46. This axial movement of the carrier 50 is effected by virtue of the angled relation of the grooves 58 of the brake adjustment mechanisms 53, these grooves being disposed with their longitudinal axes at an acute angle with respect to the axis of the housing. In other words, movement of the carrier 50 in a rotating direction causes the carrier to be moved axially toward the pressure or thrust plate 46. As the carrier 50 is thus axially moved by virtue of the angled relation of the grooves 58, the disks 51' are brought into engagement with the brake disks 49, by means of the pressure plate 52 and reaction plate 46, tending to lock the disks 49 and 51' together. This locking action is enhanced and completed by virtue of the tendency of the disks 49 and the disk holder 47' to move in the same direction by virtue of the cable load also tending to rotate the cable drum 37 in the same direction. In other words, the energizing spring assures initial contact between the disks. Since the cable load tends to rotate the disks further in the same direction through frictional contact between the disks, such rotation provides an axial pressure between the disks whereupon the disks are tightly compressed, thus preventing further drum rotation under cable load. Thus it can be seen that the engagement of the disks 49 and 51' rigidly locks the cable drum 37 against rotation and positive securing action of the drum 37 is possible in the "hold" position.

The angled relation of the grooves 58 determines the amount of axial movement which is effected by rotational movement of the carrier 50 and the amount of such axial movement can, of course, be easily adjusted by changing the angled relation of the grooves 58 relative to the balls 59 and sockets 60, the balls 59 of course tracking in the grooves 58. Thus as shown in Figure 3 the bolts or setscrews 68 may be loosened so that the cylindrical members 55 may be rotated to provide increased or decreased acute angled relation of the grooves 58 relative to the holder 47'. It is, of course, apparent that various locking means and adjusting means may be provided to provide for rotational positioning of the cylindrical members 55, only one of such locking means being disclosed. Thus it is clear that the amount of axial movement which is afforded by the carrier 50 can be controlled by the angled relation of the brake adjustments 53.

The pinion 19 is operating constantly during the "hold" position and the sun gear 28 rotates in the direction indicated in Fig. 4 causing the planets 29 to rotate relative to the planet carrier 27. Rotation of the planet gears 29 provides for rotation of the ring gear 40, this ring gear 40 rotating freely during the "hold" position. The disks 41 and 44 in the "hold" position are not in any way locked. Assuming now that the operator wishes to move the drum 37 in a "spool" direction, or in a so-called winding direction, he moves the lever 82 into the spool position shown in Figure 11. This causes the carrier 42, as indicated in Figure 11, to be moved in a clockwise direction. As the carrier 42 is moved in a clockwise direction, the carrier moves axially toward the casing portion 12. This axial movement of the carrier 42 is, like in the brake above described, accomplished by means of brake adjustments 54 which are circumferentially spaced around the casing. As indicated, the brake adjustments 54 comprise grooves 63 which are also positioned in the same or similar acute angular relation as the grooves 58. Since the cylindrical members 61 are fixed and the angled relation of the grooves 63 is fixed, rotation of the carrier 42 operates to move the carrier and plate 45 in an axial direction toward the housing portion 12, the said housing portion 12 serving as pressure reaction means. The ring gear and the disks carried thereon are spinning in the same rotational direction in which the carrier 42 is being moved. The disks 41 and 44 are now brought in engagement due to the axial movement of the carrier 42 and the friction between the disks causes further movement in the same direction so that the disks tend to securely engage each other and lock. The ring gear 40 is now locked in position and as a result the planet gears 29 serve to rotate the planet carrier 27 in response to rotation of the sun gear 28. The planet carrier 27 being fixed with respect to the cable drum 37 now rotates the cable drum 37 in a "spool" direction.

The cable drum 37 is now rotated in a direction to wind up the cable and this direction is opposite to the direction in which it has a tendency to turn in the "hold" position. Thus the direction for raising the drum is in the direction of the arrow shown in Figure 4. This rotation of the drum in the spool position causes the carrier 50, shown in Figure 10, to be moved in a counterclockwise direction simultaneously moving said carrier axially in the direction of the drum. Thus the rotation of the carrier 50 is against the action of the spring 103 and the disks 51' move out of engagement with the disks 49 so that the said disks are relatively loose when the drum 37 is rotated from the "hold" to the "spool" position. Since the brake is now loose, spooling of the cable drum 37 is accomplished. The "unspool" position is the position wherein the drum 37 is free from any restraint so that the cable may be reeled from the drum.

Referring now to Figures 8, 9 and 11, the lever 82 is raised (particularly shown in Figure 11) whereupon the fork 133 by means of its engagement with the stud 130 moves the carrier 42 in a counterclockwise direction. As the carrier 42 is moved in this direction it is also moved in a direction axially away from the casing 12 and thus disengagement of the plates 41 and 44 is effected. Movement of the lever 82 into the "unspool" position of course also causes such movement of the boss 106 whereupon the setscrew 108 engages the projection 90 to move the arm 89 in a manner wherein the carrier 50 shown in Figure 10 is moved in a counterclockwise direction. The angled groove 91 is so arranged relative to the ball 70 and socket 69, that upon rotation of the rocker arm 89, the carrier 50 is moved in a counterclockwise direction, The angled groove 91 accommodates the axial movement of the carrier 50 when it is rotated, the said axial movement, of course, being effectuated by the grooves 63 and balls 64. Thus the disks 41 and 44 and the brake disks 49 and 51' are free relative to each other. The ring gear 40 again may rotate, and the planet carrier 27 with the drum 37 are free to rotate, or unwind.

The casing is filled with oil and both brakes operate in the oil bath. Thus since foreign material cannot enter into the casing improper glazing of the disks and braking surfaces does not occur. Thus a positive action is assured at all times.

Referring now particularly to Figures 8 and 9, it is apparent that the spring 122 serves to maintain the collar 104 and the arms 134 and 89 in the "hold" or neutral position indicated. Any movement of the lever 82 in either direction is against the action of the spring 122 which tends to return the arm 82 to the neutral or "hold" position. Adjustment of the position of the collar 104 is, of course, readily accomplished by means of loosening the jam nut 117 rotating the rod 116 relative to the sleeve 115. The extent of counterclockwise rotation of the carrier 50, as shown in Figure 10, also can be adjusted by turning the setscrew 108. The setscrew 108 may be adjusted by means of the extension 110 so that an operator can simply insert a hexagonal key into the sleeve 113 for rotating the extension, thus rotating the setscrew 108. Thus the position of the carrier 50 can be adjusted by adjusting the relative location of the arm 89 on the shaft portion 88. Likewise the carrier 42 may be adjusted in its rotational positions by simply rotating the setscrew 137 relative to the arm 134. This rotation of the setscrew 137 also is accomplished by means of an extension 141 in the same manner as the extension 110 referred to above. Thus relatively fine adjustment of the brake carriers is accomplished, this adjustment being within the housing but being effected by the operator without any necessity of opening any portion of the housing. The position of the carriers thus may be adjusted to any degree desired and similarly the amount of axial movement during any rotation of the carriers can be controlled by means of the adjustments 53 and 54 as effected by the rotational adjustments above referred to. Thus effective control is accomplished over the carriers and by relatively simple adjustments the brakes may be properly adjusted to the desired extent.

The operation of the modified embodiment shown in Figures 5 and 7 is identical to the operation above described. The differences in the construction, however, lie in the fact that the casing portion 12 includes the splines 71. Thus the interior of the casing portion 12 resembles a large gear having internal teeth, the splines 71 in effect being the teeth and the same being acutely angled in a direction indicated. The carriers 50 and 42 on the other hand also have splines 72 and 73 which mate or track relative to the splines 71. These splines in effect accomplish the same purpose accomplished by the brake adjustments 53 and 54 shown in Figure 2. Thus rotation of the carriers 50 and 42 is effective to provide for axial movement for compressing the brake disks. The operation of the controls and levers above described is the same and during clockwise rotation of the carriers 50 and 42 locking action of the disks takes place. The description of the operation of the schematic diagram in Figure 7 is the same as that in Figure 4, the only difference again being the fact that in this case the carriers 50 and 42 are moved axially by virtue of splines 71 and 72.

It is now apparent that the brake disks are self-energized by virtue of the self-energizing spring arrangement. The tendency of the drum to rotate in the "hold" position causes an increased locking action of the brake disks. Further, the brake carriers may be adjusted by means of the adjustable mechanisms so that increased axial movement or decreased axial movement may be controlled in relation to the amount of rotational movement afforded by the control lever arms. Thus the braking action is completely positive and maintenance problems are maintained at a minimum by virtue of the oil sealed casing. In the modified form of the invention shown in Figures 5 and 6 it is, of course, apparent that the degree of angularity of the splines 71, 72 and 73 determines the amount of axial movement upon rotation of the brake carriers. Fine adjustment of the positions of the carriers may be made by means of the adjustable devices shown in Figures 8 through 11. Furthermore, it is readily apparent that such adjustment can be made without entering into the sealed casing by the employment of the extension devices 110 and 141.

The objects of the invention have thus been fully achieved. Changes in construction and further modifications may be made which do not depart from the spirit of the invention as disclosed or the scope thereof as defined in the appended claims.

What is claimed is:

1. A disk brake assembly including means for utilizing the frictional drag between said disks for energizing and restoring said assembly comprising, a first rotatable annular member, a second rotatable and axially movable annular member concentrically positioned with respect to and disposed about the periphery of said first annular member, a first disk set splined to the periphery of said first annular member, a second disk set splined on the inner periphery of said second annular member, said disks of said first set being alternately stacked with respect to said second set, a pressure reaction member adjacent one side of said disk sets, a pressure plate on said second annular member adjacent the opposite side of said disk sets, said pressure plate being adapted to press said disks of said sets against said pressure reaction member when said second annular member is moved axially toward said reaction member, means for moving said second annular member axially toward said reaction member responsive to the frictional drag between said disks when said annular members are rotated in one direction, and for axially moving said second annular member away from said pressure reaction member responsive to the frictional drag between said disks when said annular members are rotated in the other direction, said means including a socket disposed in a peripheral surface of said second rotatable annular member, a ball disposed in said socket, and a stationary member on said assembly having a groove disposed at an angle relative to the axis of said second rotatable annular member, said ball being positioned to track within said groove.

2. A disk brake assembly in accordance with claim 1, including spring biasing means normally urging said second annular member in said one direction.

3. In a winding mechanism having an annular member rotatable in one direction for winding action and in the opposite direction for unwinding action, a first set of brake disks splined on the outer periphery of said annular member for rotation therewith, a brake disk carrier rotatably positioned in said winding mechanism concentrically outwardly of said first set of brake disks, a set of second brake disks splined to said brake disk carrier and positioned in spaced alternative arrangement with said first set of brake disks, a fixed pressure reaction member mounted on said winding mechanism and disposed adjacent one side of said brake disk sets, reaction means on said brake disk carrier extending axially inwardly thereof in axial alignment with said brake disk sets on the other side thereof for moving said brake disks axially with axial movement of said brake disk carrier against said fixed pressure reaction member, first actuating means formed on the outer periphery of said brake disk carrier, said first actuating means including a socket, a ball disposed in said socket, second actuating means including an actuating element carried on said mechanism, said actuating element including a groove having its axis disposed angularly with respect to the axis of said brake disk carrier, said ball being disposed in said groove in tracking relation, said second actuating means and first actuating means cooperating with said first reaction means for moving said brake disk carrier axially toward said pressure reaction member attendant to a rotation of said carrier and attendant to rotation of said annular member in said one direction and for moving said brake disk carrier axially away from said pressure reaction member attendant to rotation of said annular member in said opposite direction.

4. In a winding mechanism in accordance with claim 3, said actuating element including means being rotatable about an axis extending transversely with respect to the axis of said disk carrier for changing the angular position of said groove.

References Cited in the file of this patent

UNITED STATES PATENTS

| | | |
|---|---|---|
| 1,676,344 | Newmann | July 10, 1928 |
| 1,792,467 | Osgood | Feb. 10, 1931 |
| 1,986,728 | Hardy | Jan. 1, 1935 |
| 2,071,107 | Blatt | Feb. 16, 1937 |
| 2,076,538 | Bendix | Apr. 13, 1937 |
| 2,240,219 | Lambert | Apr. 29, 1941 |
| 2,245,988 | Lambert | June 17, 1941 |
| 2,382,482 | Henry | Aug. 14, 1945 |
| 2,545,892 | Moore | Mar. 20, 1951 |
| 2,548,270 | Osgood | Apr. 10, 1951 |
| 2,552,859 | Nardone | May 15, 1951 |
| 2,557,324 | Tomlinson | June 19, 1951 |
| 2,569,651 | Bannan | Oct. 2, 1951 |
| 2,631,477 | Ball | Mar. 17, 1953 |
| 2,681,205 | Bannister et al. | June 15, 1954 |